March 2, 1971 E. W. HENDERSON ET AL 3,567,395
APPARATUS FOR PRODUCING CARBON BLACK
Filed Oct. 21, 1968 2 Sheets-Sheet 1

INVENTORS.
E. W. HENDERSON
G. J. FORSETH
BY S. A. CUNNINGHAM

*Young & Quigg*
ATTORNEYS

United States Patent Office 3,567,395
Patented Mar. 2, 1971

3,567,395
APPARATUS FOR PRODUCING CARBON BLACK
Eulas W. Henderson, Bartlesville, Okla., Glenn J. Forseth, Phillips, Tex., and Sheldon A. Cunningham, Corvallis, Oreg., assignors to Phillips Petroleum Company
Filed Oct. 21, 1968, Ser. No. 769,282
Int. Cl. C01b 31/00; C09c 1/48
U.S. Cl. 23—259.5
9 Claims

ABSTRACT OF THE DISCLOSURE

A choke for an axial type carbon black reactor which consists of an element slidably positionable along the axis of the axial tunnel, the passageway through the choke being adapted to be altered in respect to area.

---

This invention relates to the production of carbon black. In one of its more specific aspects, this invention relates to improved apparatus for producing carbon black by he pyrolytic decomposition of hydrocarbons.

Exceptionally high structure blacks have been made in a recently developed carbon black reactor known as the axial reactor. Generally speaking, this reactor consists of a plurality of reaction zones in axial, contiguous relationship in which the first zone is generally known as the axial zone. Into this zone is generally introduced a large portion of the hydrocarbon feedstock, or make-oil, which is reacted to produce the carbon black. Some portion of the air and a combustible gas, such as methane, which is used to supply heat to the reaction, may also be introduced into this first zone.

The reaction mixture so formed is then conducted into the second zone, which is known as the combustion zone. In this zone, there is generally introduced, either radially or tangentially, some additional portion of the combustion gas and possibly some additional portion of the hydrocarbon make-oil.

The third zone is generally referred to as the reaction zone and may be considered as that zone in which a principal portion of the carbon black is formed. This zone is equipped with conduits through which the carbon black and gases formed in the reaction are removed from the reactor. Separation of the carbon black is made in separate equipment apart from the carbon black furnace.

Recent developments in the axial tunnel reactor have been concerned with conducting the process using a variably positionable make-oil nozzle in the first axial zone. Generally, this oil introduction nozzle has been adapted for positioning at any point from the upstream portion of the axial zone to about the midpoint of the combustion zone.

Another development concerning the axial reactor has concerned the installation of a choke in the axial reactor. Such chokes are generally adapted to fit around the periphery of the inner wall of the axial section and are equipped with a passageway through their longitudinal axis for the passage of some portion of the reactants therethrough, or for the purpose of allowing adjustment of the make-oil nozzle which extends there-through. Such developments have facilitated the production of high structure black. However, difficulties with carbon deposits have been encountered in these reactors.

It has now been discovered that if the choke is further modified in respect to varying its throughput, carbon blacks of a wider range of properties are producible within the same reactor. Accordingly, this invention provides a choke, the passageway of which can be varied. Additionally, this invention provides a choke having a passageway the throughput of which can be altered in respect to both quantity and direction of flow.

According to this invention, there is provided an axial reactor for the production of carbon black by the pyrolytic decomposition of a hydrocarbon which comprises a plurality of axially aligned, contiguous reaction zones, there being positioned within the first of said zones a choke having a passageway along its longitudinal axis, the diameter of which passageway can be varied.

In another embodiment of this invention, the choke is equipped with a port, the inlet area of which can be altered.

Accordingly, it is an object of this invention to provide an improved carbon black reactor. It is another object of this invention to provide an improved choke for a carbon black reactor.

These and other objects of the invention will become apparent from the following discussion.

The invention as described herein is generally applicable to conventional methods of producing carbon black in conventional carbon black furnaces, under the usually employed operating conditions and charge rates.

The apparatus of this invention will be more easily understood by referring to the attached drawings in which FIG. 1 is an illustration of one embodiment of a choke.

Figure 1:
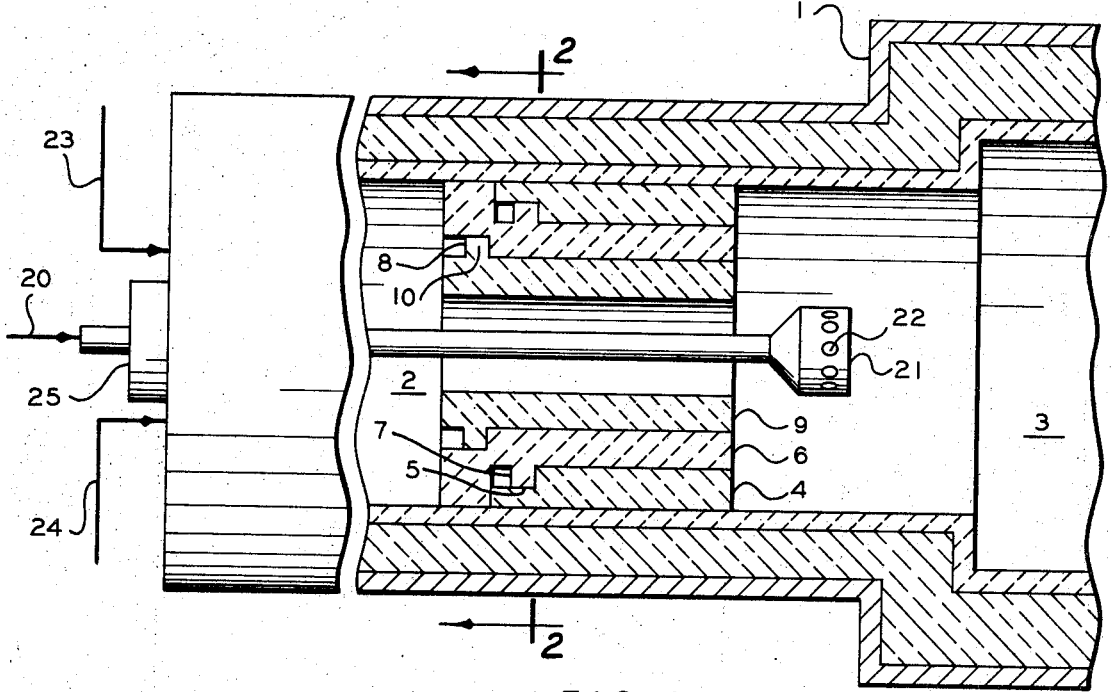

Referring now to FIG. 1, there is shown reactor 1 having axial section 2 and combustion section 3, only a portion of which is shown. The reaction section of the carbon black furnace is also not indicated.

Axial section 2 is adapted with a make-oil inlet 20, air inlet conduit 23, and fuel gas inlet 24. Make-oil inlet 20 is adapted for altering the length of the conduit extending within axial section 2 by means of packing gland 25. The make-oil inlet conduit 20 is fitted with make-oil nozzle 21 having apertures 22 through which oil is discharged. Make-oil nozzle 21 is positionable at any point along the longitudinal axis of axial section 2 and combustion section 3 by adjusting the extension of make-oil inlet conduit 20 through a packing gland 25.

Any practical number of concentric chokes having a common longitudinal axis may be positioned within axial section 2. In the illustration three such chokes, base choke 4, choke section 6, and choke section 9, are shown.

The diameter of the opening through the smallest choke will be limited to that necessary for moving make-oil nozzle 21 therethrough.

With the exception of base choke 4, each choke is preferably fitted with a projecting ear for interlocking into the next choke of increased diameter. For example, choke section 6 is equipped with ear 7 for interlocking into notch 5 of base choke 4. In a similar manner, choke section 9 is equipped with ear 10 for interlocking into notch 8 of choke section 6. Hence, by a notch and ear arrangement, a series of chokes can be installed within the axial zone to provide a large number of chokes of different axial diameters.

Figure 2:
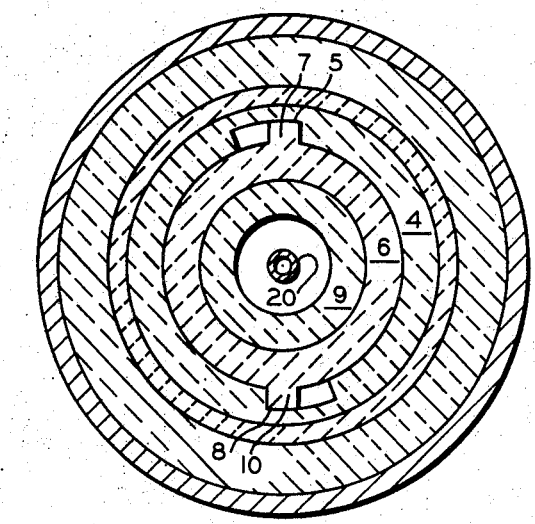
FIG. 2 is a cross-sectional view of the choke of FIG. 1 taken through section 2—2 of FIG. 1.
Figure 4:
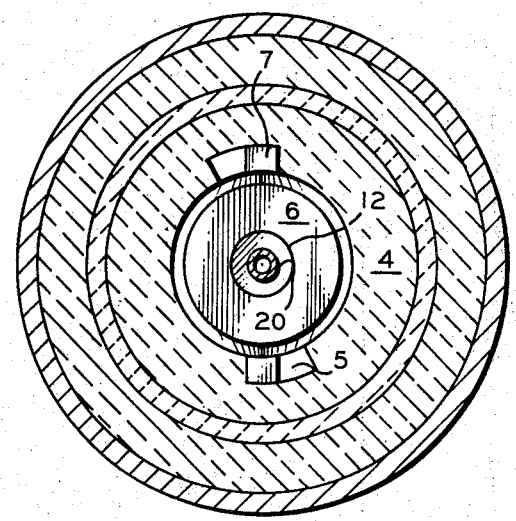
FIG. 4 is a cross-sectional view of FIG. 3 taken through section 4—4 of FIG. 3.

Referring now to FIG. 2, the interlocking principles incorporated in interrelating the various sections of the choke together are shown. This "bushing-type" of choke interrelationship provides for the easy fitting of the ears 7 and 10 into notches 5 and 8 and, similarly, for the easy disengagement thereof.

Figure 3:
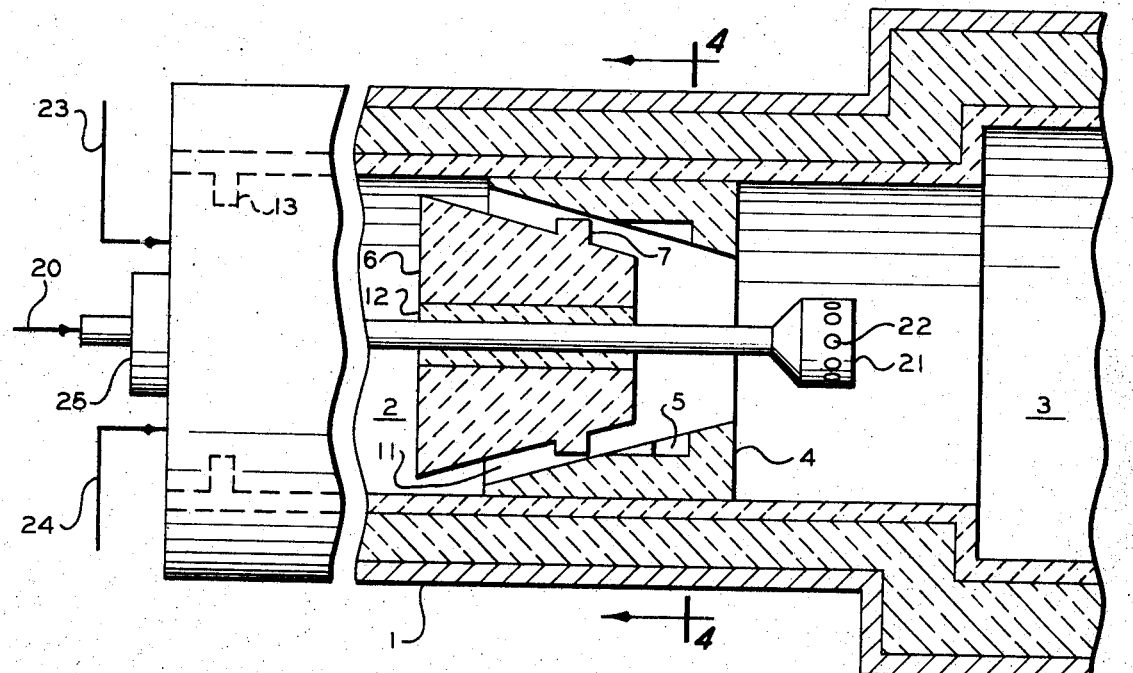
FIG. 3 is an illustration of an embodiment of the choke of this invention.

In FIG. 3 there is shown an embodiment of the interlocking principle in respect to choke diameters in which a larger number of factors relative to the flow of material therethrough can be varied; for example, it is possible to vary the quantity and the velocity of gas through the choke of FIG. 3 and it is further possible, to decrease the quantity of gas through the choke to zero and in essence, change the axial tunnel reactor to a conventional type carbon black reactor in which there exists no axial tunnel.

Referring now to FIG. 3, there is illustrated reactor 1, having axial section 2 and combustion section 3. Axial section 2 is adapted for oil introduction through make-oil inlet conduit 20 equipped with make-oil nozzle 21 having apertures 22 therein for the discharge of the make-oil. Oil conduit 20 is adjustable within axial section 2 through packing gland 25.

Axial section 2 is further adapted with air inlet conduit 23 and fuel inlet conduit 24. The choke arrangement in this adaptation consists of base choke 4 and choke plug 6. Base choke 4 is of a configuration adapted to receive choke plug 6. Base choke 4 is equipped with notches 5 to receive ear 7 of choke plug 6. By interlocking choke plug 6 into choke 4, by, for example, seating ears 7 in notches 5 with a turn of plug 6, it is possible to move and position choke 4 at any location along the longitudinal length of axial section 2. Then, by disengaging plug 6, from choke 4 it is possible to position plug 6 relative to base choke 4 to provide any desired area 11 therebetween.

Choke plug 6 will be slidably mounted by means of packing 12 on make-oil inlet conduit 20. By withdrawing plug 6 against stops 13, it is possible to position choke 6 along conduit 20 and so alter the distance between nozzle 21 and the downstream face of plug 6.

Conversely, by pushing choke plug 6 into base choke 4 it is possible to position plug 6 on make-oil conduit 20 and so alter the distance between make-oil nozzle 21 and choke plug 6.

Accordingly, it is possible not only to alter the flow area between choke plug 6 and base choke 4 but it is also possible to position make-oil nozzle 21 both in respect to base choke 4 and choke plug 6.

It will be further seen that by seating choke plug 6 in base choke 4, flow areas therebetween can be altered to the point where such flow area is eliminated. Hence introduction of air and fuel through conduits 23 and 24 is no longer possible, and in essence, the reactor will be converted from one in which some portion of the air and fuel gas are introduced into the axial section into one in which the entire quantity of air and fuel introduced is done through combustion section 3.

It will be further seen that by interlocking plug 6 with base choke 4, it is possible to relocate base choke 4 within axial zone 2 to the point of extending into combustion section 3, and simultaneously, to convert the axial type reactor into the conventional type reactor in which the axial section is not present.

It will be appreciated that variations can be made to either of the previously described arrangements. For example, with reference to the choke described in relation to FIG. 3, it is possible to form the leading or downstream edge of plug 6 of an inwardly conical section allowing make-oil nozzle 21 to be drawn back thereinto thus allowing apertures 22 to be positioned at, or in alignment with, the downstream face of plug 6. Also, while the choke of FIG. 3 has been described as a conical choke, it will be evident that the invention allows itself to be adapted to other shapes of choke and choke plug, for example the base choke 4 can be of ellipsoidal configuration, choke plug 6 in matching conformity therewith.

Figure 5:
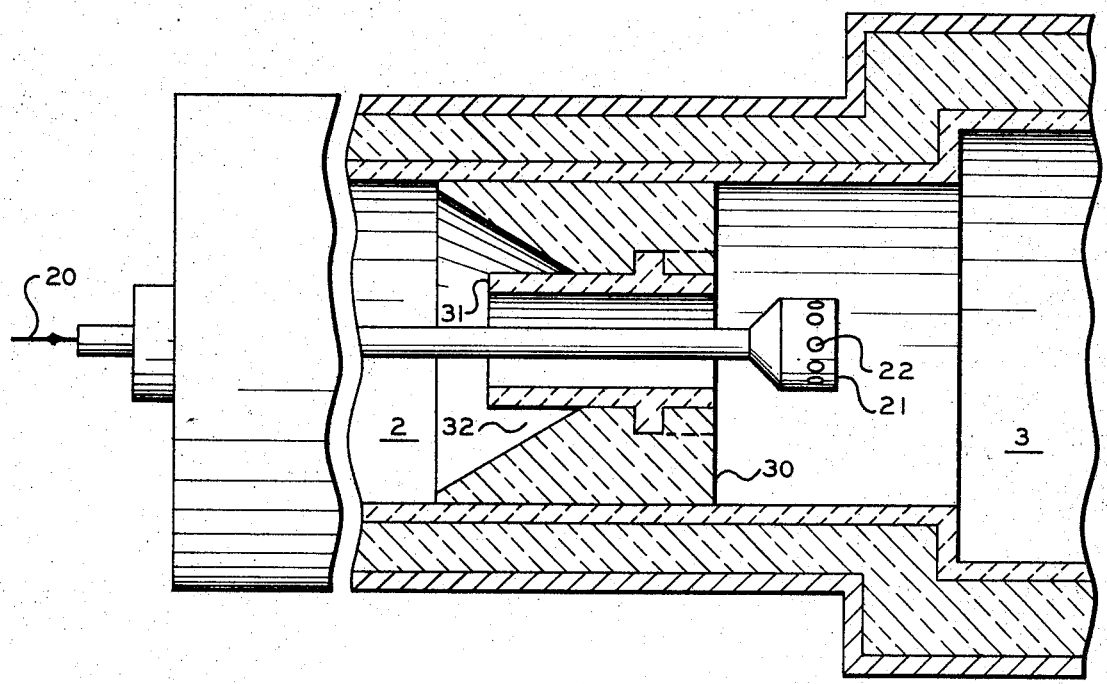
FIG. 5 is an illustration of an embodiment of the choke illustrated in FIG. 3.

FIG. 5 is an illustration of an embodiment of the choke illustrated in FIG. 3. In this instance base choke 30 has insertable thereinto tube 31, oil conduit 20 extending through tube 31. Considerable turbulence is created in this choke by the upstream extension of tube 31 forming zone 32 peripheral to tube 31. Tube 31 is optionally interlockable into base choke 30 by keyed arrangement. Also, the annular zone between the inner walls of tube 31 and oil conduit 20 can be varied depending upon the wall thickness employed in forming tube 31. It will be appreciated that other combinations of base choke configurations and choke inserts can be employed which create other turbulent zones either on the upstream or downstream side thereof, these zones being of the nature of zone 32.

While the apparatus and method of this invention have been described in relation to particular embodiments, it will be appreciated that such description suggests many variations. For example, the interlocking choke mechanism of FIG. 1 can be more slidably positionable along the length of axial section 2, to mention only one. (Similarly, while the choke has been described in terms of a trisectional device, that is, a base section and two insert sections, it is evident that the choke can be composed of any number of pieces.) However, none of these variations are considered to be outside of the scope of the invention.

What is claimed is:

1. In a carbon black reactor having an axial section adapted with a variably positionable feed inlet conduit, said axial section being in axial contiguous communication with a combustion section adapted with conduit for the introduction of combustion gases, the improvement comprising a choke slidably positionable within said axial section said choke being comprised of a plurality of sections, at least one of said sections being a base section and at least one of said sections being a plug section insertable into said base section and retainable in said base section by interlocking means, said choke being adapted with a bore for the projection therethrough of said variably positionable feed inlet conduit.

2. The apparatus of claim 1 in which said plug section is mounted on said variably positionable feed inlet conduit.

3. The apparatus defined in claim 1 in which said interlocking means comprises a notch and ear, said ear being interlockable in said notch.

4. The apparatus as defined in claim 1 in which said choke comprises a base section and two plug sections, the first of said plug sections being adapted for interlocking into said base section and the second of said plug sections being adapted for interlocking into the first of said plug sections.

5. The apparatus of claim 1 in which said bore is of substantially uniform area along its length.

6. The apparatus of claim 1 in which said bore is of decreasing area along its length.

7. The apparatus of claim 1 in which said base section and said plug sections are positionable in interlocked arrangement along the length of said axial section.

8. The apparatus of claim 1 in which said plug section comprises a first section insertable into said base section and a second section positionable in interlocked relationship to said first section and extending upstream of said first section.

9. The apparatus of claim 1 in which said plug section is of conical configuration.

References Cited
UNITED STATES PATENTS

| | | | |
|---|---|---|---|
| 2,682,450 | 6/1954 | Sweigart et al. | 23—259.5 |
| 2,865,717 | 12/1958 | Krejci | 23—259.5X |
| 3,060,003 | 10/1962 | Williams | 23—259.5X |

JAMES H. TAYMAN, Jr., Primary Examiner

U.S. Cl. X.R.

23—209.4, 277; 431—188